(12) United States Patent
Saito et al.

(10) Patent No.: US 8,838,641 B2
(45) Date of Patent: Sep. 16, 2014

(54) CONTENT RECOMMENDATION SYSTEM, CONTENT RECOMMENDATION METHOD, CONTENT RECOMMENDATION DEVICE, AND INFORMATION STORAGE MEDIUM

(75) Inventors: Katsu Saito, Saitama (JP); Masaaki Isozaki, Kanagawa (JP); Wataru Onogi, Kanagawa (JP); Kazuo Ishii, Tokyo (JP); Nozomu Ikeda, Tokyo (JP); Yoshikazu Takahashi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/380,528

(22) PCT Filed: Jun. 8, 2010

(86) PCT No.: PCT/JP2010/059678
§ 371 (c)(1),
(2), (4) Date: Dec. 23, 2011

(87) PCT Pub. No.: WO2011/007631
PCT Pub. Date: Jan. 20, 2011

(65) Prior Publication Data
US 2012/0096026 A1    Apr. 19, 2012

(30) Foreign Application Priority Data
Jul. 14, 2009 (JP) .................. 2009-165391

(51) Int. Cl.
*G06F 17/30* (2006.01)
(52) U.S. Cl.
CPC .... *G06F 17/30867* (2013.01); *G06F 17/30029* (2013.01); *G06F 17/30053* (2013.01)
USPC ........................ 707/769
(58) Field of Classification Search
CPC ................ G06F 17/30029; G06F 17/30053; G06F 17/30867

USPC .................. 707/769, 758, 705, E17.014
See application file for complete search history.

(56) References Cited

U.S. PATENT DOCUMENTS

| | | | | |
|---|---|---|---|---|
| 6,308,175 | B1* | 10/2001 | Lang et al. ............... | 707/608 |
| 2003/0225777 | A1* | 12/2003 | Marsh ................. | 707/101 |
| 2004/0068552 | A1* | 4/2004 | Kotz et al. ............... | 709/218 |
| 2005/0154718 | A1* | 7/2005 | Payne et al. ............... | 707/3 |
| 2007/0011203 | A1* | 1/2007 | Tsunoda ................. | 707/104.1 |
| 2007/0162502 | A1* | 7/2007 | Thomas et al. ........... | 707/104.1 |

FOREIGN PATENT DOCUMENTS

| | | |
|---|---|---|
| JP | 2001-160955 | 6/2001 |
| JP | 2002-189675 | 7/2002 |
| JP | 2005-222461 | 8/2005 |
| JP | 2005-332265 | 12/2005 |

* cited by examiner

*Primary Examiner* — Shiow-Jy Fan
(74) *Attorney, Agent, or Firm* — Finnegan, Henderson, Farabow, Garrett & Dunner, L.L.P.

(57) ABSTRACT

The content recommendation system includes a user attribute information acquisition means for acquiring attribute information of a given user, a list acquisition means for acquiring at least one list from among lists of content sequentially generated over time on the basis of the attribute information of the given user acquired by the user attribute information acquisition means, a user preference information acquisition means for acquiring user preference information, which is feature information of content preferred by the given user, a content extraction means for extracting some content from content included in the list acquired by the list acquisition means on the basis of the user preference information acquired by the user preference information acquisition means, and a content presentation means for presenting the content extracted by the content extraction means to the given user.

16 Claims, 10 Drawing Sheets

FIG.8

| USER ID | AGE | CITY OF RESIDENCE | LANGUAGE |
|---------|-----|-------------------|----------|
| 0001 | 28 | TOKYO | JAPANESE |
| 0002 | 32 | OSAKA | ENGLISH |
| 0003 | 18 | FUKUOKA | JAPANESE |

FIG.9

| MUSIC ID | 13 YEARS OLD OR LESS /TOKYO/JAPANESE | 14 YEARS OLD/ TOKYO/JAPANESE | 15 YEARS OLD/ TOKYO/JAPANESE | 13 YEARS OLD OR LESS /TOKYO/ENGLISH | 14 YEARS OLD/ TOKYO/ENGLISH |
|---|---|---|---|---|---|
| 0001 | 1057-321-153 | 2010-110-314 | 3984-1531-210 | 210-31-8 | 349-164-25 |
| 0002 | 883-28-99 | 694-367-105 | 591-131-215 | 312-219-3 | 354-283-15 |

| TIME | USER ATTRIBUTE RANGE | RANKING |
|---|---|---|
| JUNE 2009 | 15 YEARS OLD OR LESS /TOKYO/JAPANESE | ① 3352　② 261　③ 3942 ··· |
| JUNE 2009 | 15 YEARS OLD OR LESS /TOKYO/ENGLISH | ① 3352　② 1329　③ 2241 ··· |

FIG.12

| MUSIC ID | FEATURE 1 | FEATURE 2 | FEATURE 3 | FEATURE 4 | ... | FEATURE M |
|---|---|---|---|---|---|---|
| 0001 | 0.1 | 0.2 | 0.3 | 0.0 | | 0.1 |
| 0002 | 0.8 | 0.0 | 0.0 | 0.1 | | 0.0 |

FIG.13

| MUSIC ID | RELAXED | BALLAD | HAPPY | ACTIVE |
|---|---|---|---|---|
| 0001 | 1 | 0 | 1 | 0 |
| 0002 | 0 | 1 | 0 | 0 |
| 0003 | 0 | 0 | 1 | 1 |

CONTENT RECOMMENDATION SYSTEM, CONTENT RECOMMENDATION METHOD, CONTENT RECOMMENDATION DEVICE, AND INFORMATION STORAGE MEDIUM

TECHNICAL FIELD

The present invention relates to a content recommendation system, a content recommendation method, a content recommendation device, and an information storage medium, and more particularly, to content recommendation technology.

BACKGROUND ART

Recently, it has become possible to enjoy what one desires from among a great number of pieces of content by use of a communication network such as the Internet. Various recommendation technologies have been proposed according to a great number of pieces of available content. For example, in content-based filtering, content to be recommended to a user among a number of pieces of content is extracted according to similarity between feature information of content and feature information of content preferred by the user.

SUMMARY OF INVENTION

Technical Problem

However, the content-based filtering has a problem in that the same content is continuously recommended to the user as long as the feature information of the content preferred by the user does not change.

The present invention has been made in view of the above-described problem, and an object of the invention is to provide a content recommendation system, a content recommendation method, a content recommendation device, and an information storage medium that can diversify content to be recommended to a user.

Solution to Problem

According to the present invention in order to solve the above-described problem, there is provided a content recommendation system characterized in including: a user attribute information acquisition means for acquiring attribute information of a given user; a list acquisition means for acquiring at least one list from among lists of content sequentially generated over time on the basis of the attribute information of the given user acquired by the user attribute information acquisition means; a user preference information acquisition means for acquiring user preference information, which is feature information of content preferred by the given user; a content extraction means for extracting some content from content included in the list acquired by the list acquisition means on the basis of the user preference information acquired by the user preference information acquisition means; and a content presentation means for presenting the content extracted by the content extraction means to the given user.

According to the present invention, there is provided a content recommendation method characterized in including: a user attribute information acquisition step of acquiring attribute information of a given user; a list acquisition step of acquiring at least one list from among lists of content sequentially generated over time; a user preference information acquisition step of acquiring user preference information, which is feature information of content preferred by the given user; a content extraction step of extracting some content from content included in the list acquired in the list acquisition step on the basis of the user preference information acquired in the user preference information acquisition step; and a content presentation step of presenting the content extracted in the content extraction step to the given user.

According to the present invention, there is provided a content recommendation device characterized in including: a user attribute information acquisition means for acquiring attribute information of a given user; a list acquisition means for acquiring at least one list from among lists of content sequentially generated over time; a user preference information acquisition means for acquiring user preference information, which is feature information of content preferred by the given user; a content extraction means for extracting some content from content included in the list acquired by the list acquisition means on the basis of the user preference information acquired by the user preference information acquisition means; and a content presentation means for presenting the content extracted by the content extraction means to the given user.

According to the present invention, there is provided a program for causing a computer to function as: a user attribute information acquisition means for acquiring attribute information of a given user; a list acquisition means for acquiring at least one list from among lists of content sequentially generated over time; a user preference information acquisition means for acquiring user preference information, which is feature information of content preferred by the given user; a content extraction means for extracting some content from content included in the list acquired by the list acquisition means on the basis of the user preference information acquired by the user preference information acquisition means; and a content presentation means for presenting the content extracted by the content extraction means to the given user. An information storage medium according to the present invention stores the above-described program.

BRIEF DESCRIPTION OF DRAWINGS

FIG. 8 is a diagram showing storage content of a user information storage unit.

FIG. 9 is a configuration diagram of an aggregate database (DB).

FIG. 12 is a configuration diagram of a music feature DB.

FIG. 13 is a configuration diagram of a music attribute DB.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
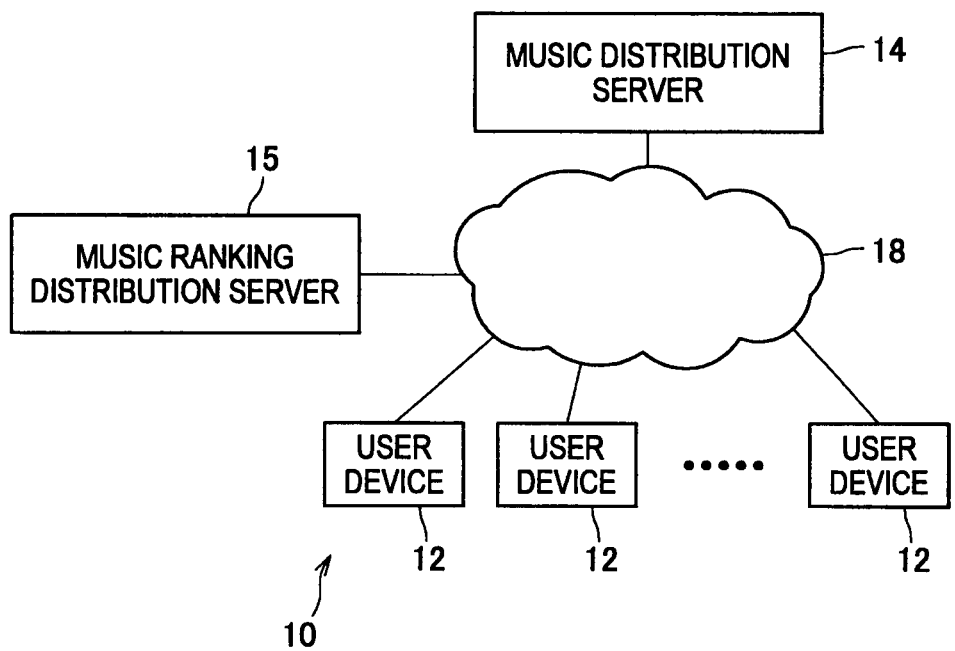
FIG. 1 is an entire configuration diagram of a content recommendation system according to an embodiment of the present invention.

FIG. 1 is an entire configuration diagram of a content recommendation system according to an embodiment of the present invention. As shown in the same drawing, the content recommendation system 10 is connected to a data communication network 18 such as the Internet, and includes a music distribution server 14, a music ranking distribution server 15, and a plurality of user devices 12, which can perform data communication with each other. The user device 12 is, for example, a computer system such as a personal computer, a computer game system, or a home server installed at home or a portable computer system such as a portable game device or a mobile phone, and receives a list of music to be recommended to a user of the user device 12 by accessing the music distribution server 14. The user device 12 requests the music distribution server 14 to provide music data included in the list, and receives and reproduces the music data. On the other hand, the music distribution server 14 is constituted, for example, by a computer system such as a well-known server computer, and transmits a list of music to be recommended to a user of each user device 12 to the user device 12. Individual music data is transmitted in response to a request from each user device 12. Here, although an application example of the present invention for a music recommendation has been described, the present invention is not limited thereto. Of course, it is possible to apply the present invention to recommend various content, for example, moving images such as movies, still images such as photos, documents such as novels, and the like. The music ranking distribution server 15 is constituted, for example, by a computer system such as a well-known server computer managed by a person different from a manager of the music distribution server 14, and returns music rankings in response to a request from the music distribution server 14. The music rankings are issued, for example, periodically such as weekly or monthly, for example, according to a music genre such as pop, jazz, or classic, by nationality, and each ranking is stored in the music distribution server 14 in association with an issuance time and a music genre. Rankings may be created in various viewpoints, and may be, for example, music rankings according to an increase in the number of purchases, music rankings according to an increase in the number of downloads, music rankings according to an increase in the number of times information related to music (for example, supporting documentation) is browsed, or the like.

Figure 2:
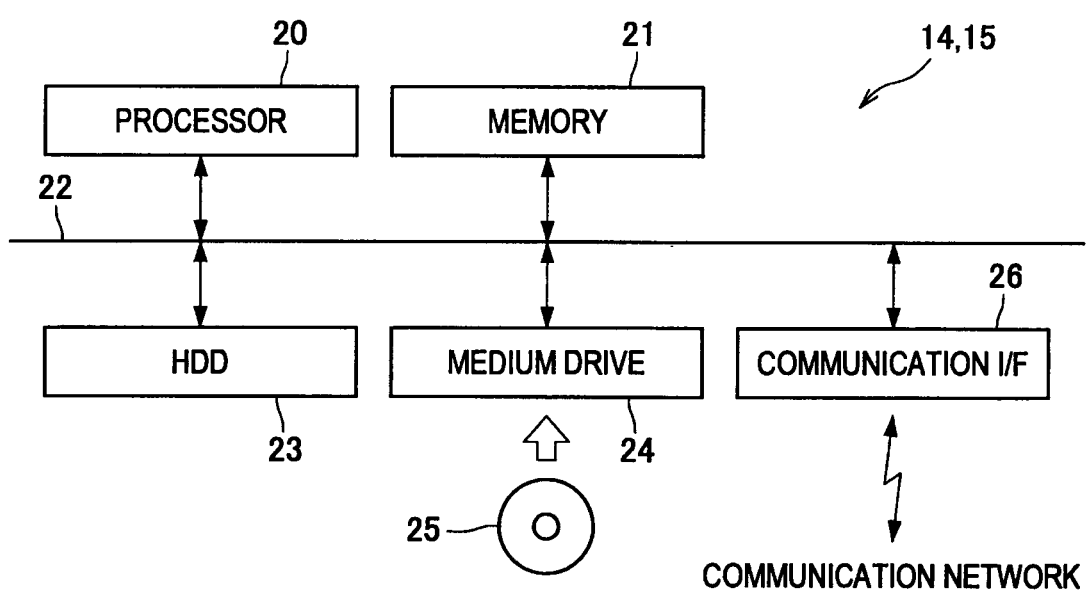
FIG. 2 is a hardware configuration diagram of a server.

FIG. 2 is a diagram showing a hardware configuration example of the music distribution server 14 and the music ranking distribution server 15. As shown in the same drawing, the music distribution server 14 or the music ranking distribution server 15 includes a processor 20, a memory 21, a hard disk drive (HDD) 23, a medium drive 24, and a communication interface (I/F) 26, which are connected to a bus 22 and configured to exchange data with one another. The memory 21 is constituted by a read only memory (ROM) and a random access memory (RAM). The ROM stores various system programs, and the RAM is mainly used to work for the processor 20. In the HDD 23, a program for music distribution or music ranking distribution is stored, or various DBs for the music distribution or music ranking distribution are constructed. The medium drive 24 is a device that reads data stored in a computer-readable medium 25 such as a compact disk-read only memory (CD-ROM) or a digital versatile disk-random access memory (DVD-RAM), or writes data thereto. The communication I/F 26 controls an operation in which the music distribution server 14 or the music ranking distribution server 15 performs data communication with another computer system via the communication network 18. The processor 20 controls each part of the server according to a program stored in the memory 21, the HDD 23, or the medium 25.

Figure 3:
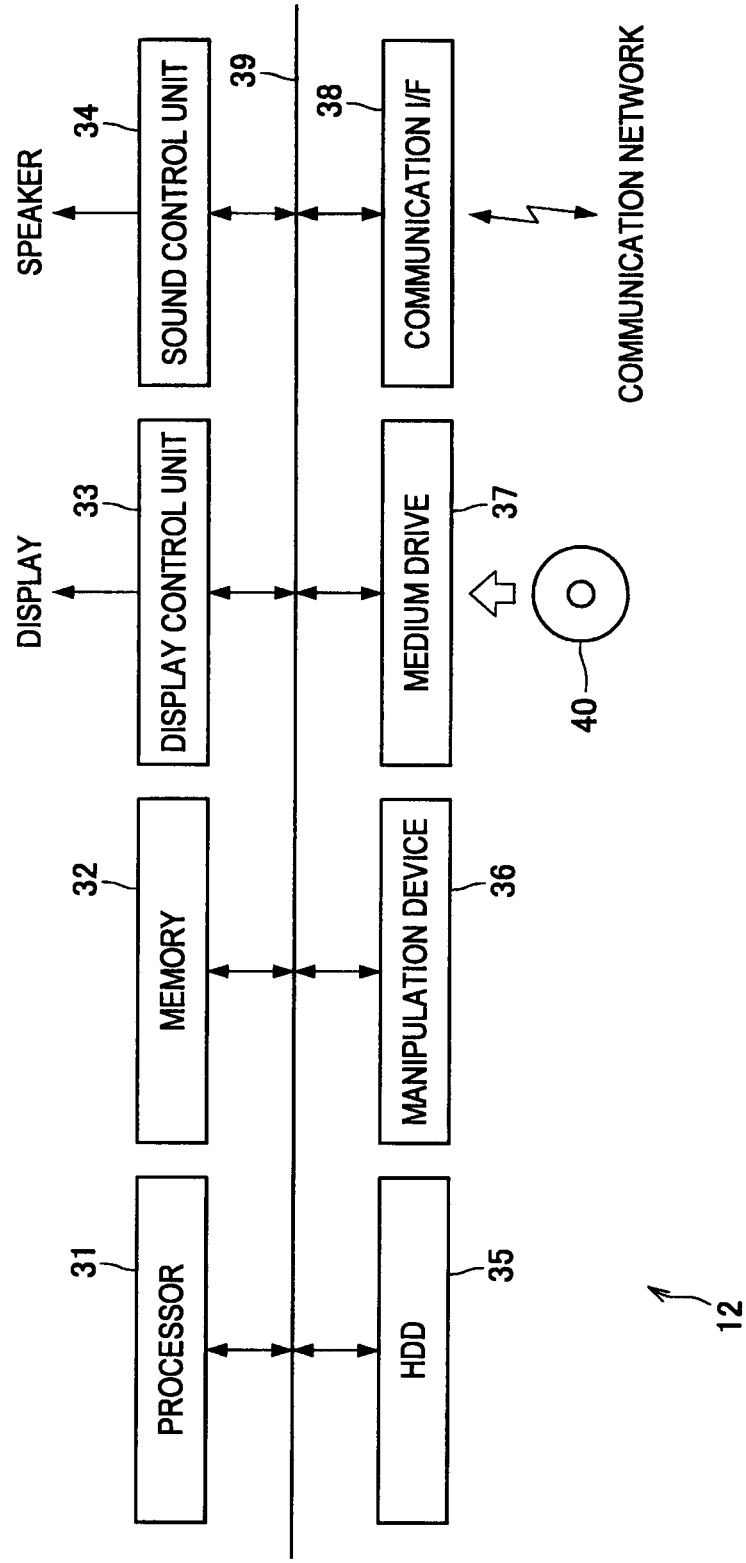
FIG. 3 is a hardware configuration diagram of a user device.

On the other hand, FIG. 3 is a diagram showing a hardware configuration example of the user device 12. As shown in the same drawing, the user device 12 includes a processor 31, a memory 32, a display control unit 33, a sound control unit 34, an HDD 35, manipulation devices 36, a medium drive 37, and a communication I/F 38, which are connected to a bus 39 and configured to exchange data with one another. The memory 32 is constituted by a ROM and a RAM. The ROM stores various system programs, and the RAM is mainly used to work for the processor 31. In the HDD 35, various programs such as a music reproduction program are stored, or various DBs are constructed. The medium drive 37 is a device that reads data stored in a computer-readable medium 40 such as a CD-ROM or a DVD-RAM, or writes data thereto. The communication I/F 38 controls an operation in which the user device 12 performs data communication with another computer system such as the music distribution server 14 via the communication network 18. The display control unit 33 is configured to include a video memory, and converts an image drawn in the video memory by the processor 31 into a video signal, outputs the video signal to a display, and causes the image to be displayed. The sound control unit 34 is configured to include a sound buffer, and the processor 31 converts sound data stored in the sound buffer into an analog sound signal and outputs the analog sound signal to speakers to be audibly outputted. The manipulation devices 36 are means for allowing the user to provide an instruction to the user device 12, and are, for example, a keyboard, a pointing device such as a mouse, a gamepad, or the like. Furthermore, the program 31 controls each part of the server device 12 according to a program stored in the memory 32, the HDD 35 or the medium 40.

Figure 4:
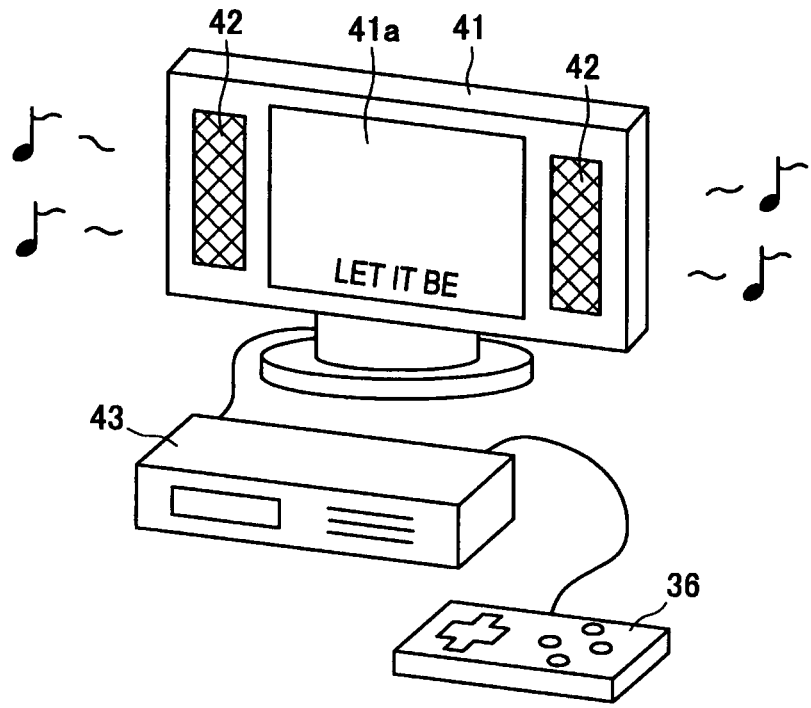
FIG. 4 is an external perspective diagram of the user device.

The user device 12 may be implemented in various types, and configured, for example, as a stationary game console operable by household power as shown in FIG. 4. In this case, each hardware element shown in FIG. 3 is accommodated in a housing 43, and a display device 41a and built-in speakers 42 and 42 of a television receiver 41 separate from the housing 43 are used as the display and the speakers. The manipulation devices 36 are also provided separately from the housing 43.

Figure 5:
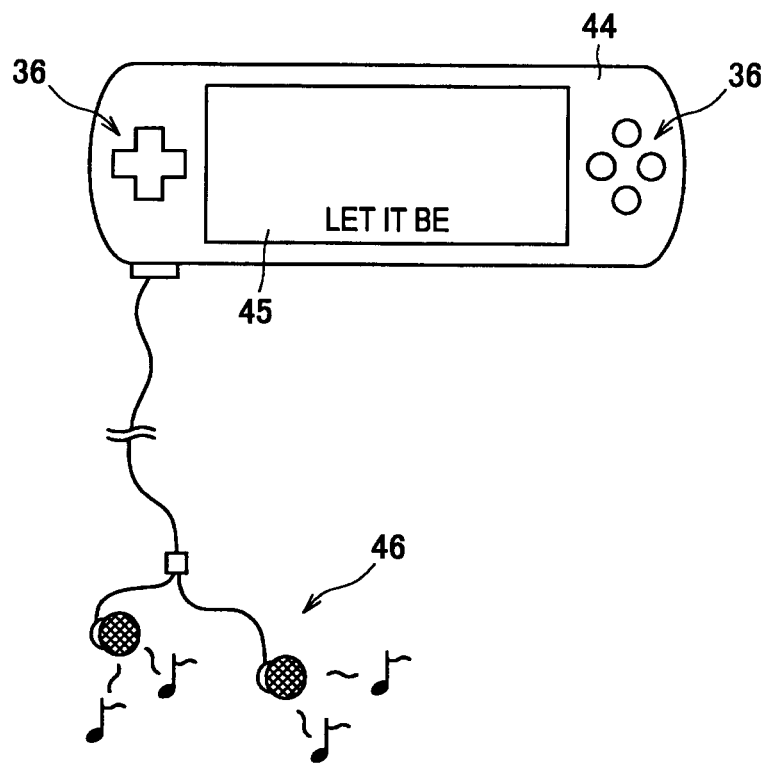
FIG. 5 is an external perspective diagram of a user device according to a modified example.

Alternatively, the user device 12 may be configured as a portable and integrated game device operable by a battery shown in FIG. 5. In this case, each hardware element shown in FIG. 3 is accommodated in a housing 44, and furthermore a flat panel display 45 provided on a surface of the housing 44 is used as the display. The manipulation devices 36 are also provided on the surface of the housing 44, and are arranged, for example, on the left and right of the flat panel display 45. Speakers (not shown) embedded in the housing 44 or stereo headphones 46 separate from the housing 44 may be used as the speakers.

Figure 6:
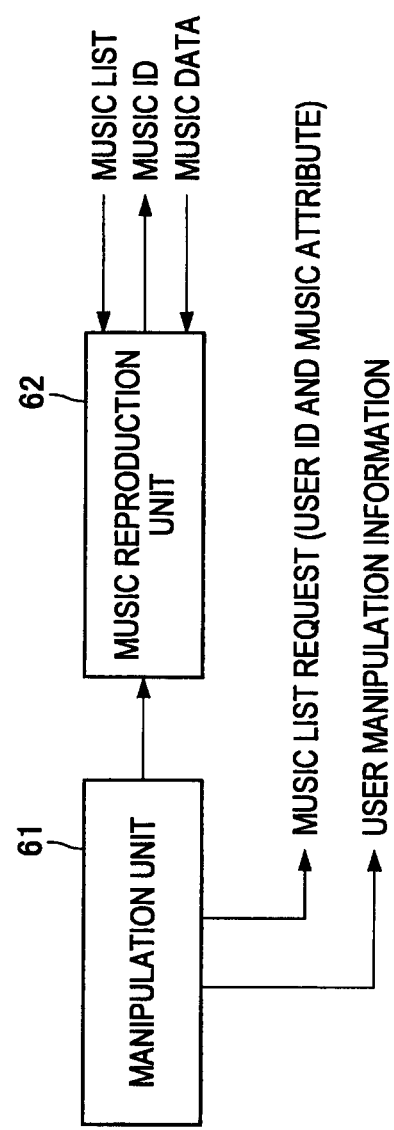
FIG. 6 is a functional block diagram of the user device.

Here, a functional configuration of the user device 12 will be described. FIG. 6 is a functional block diagram of the user device 12. As shown in the same drawing, the user device 12 is configured to functionally include a manipulation unit 61 and a music reproduction unit 62. The above-described functional elements are implemented by a program executed in the user device 12. The manipulation unit 61 is configured around the manipulation devices 36, and transmits a request of a music list (including a user ID) to the music distribution server 14 via the communication I/F 38 if a specific request manipulation to the manipulation devices 36 is performed. In the request, a user ID and a designation of an attribute of music (for example, a mood such as relaxed, ballad, happy, or active) are included. The attribute of music may be designated by the user using the manipulation devices 36, or may be randomly selected. A preference vector to be described later may be managed by the user device 12. In this case, user preference information managed may be included in the request of the music list. The music reproduction unit 62 to be described later receives a music list returned by the music distribution server 14 via the communication network 18 in response to the request, and transmits identification information of each piece of music included in the music list, that is, a music ID, to the music distribution server 14 via the communication I/F 38. The music reproduction unit 62 reproduces music data returned from the music distribution server 14 using the sound control unit 34 in response to the transmission of the music ID. At this time, the music reproduction unit 62 displays song title data included in the music data on the display as shown in FIGS. 4 and 5.

When an explicit negative manipulation (a specific manipulation indicating that the user does not like the corresponding music) to the manipulation devices 36 is performed during music reproduction, the manipulation unit 61 transmits a negative evaluation to the music distribution server 14 along with a music ID of reproduced music and a user ID. When a skip manipulation to the manipulation devices 36 is performed during music reproduction, the music reproduction unit 62 is notified of the skip manipulation. The music reproduction unit 62 stops the reproduction of music according to the notification, transmits the next music ID to the music distribution server 14, and reproduces returned music data. Even when the skip manipulation is performed as described above, the manipulation unit 61 may be configured to transmit a negative evaluation to the music distribution server 14 along with a music ID of reproduced music and a user ID. When music is fully reproduced without being skipped, the music reproduction unit 62 notifies the manipulation unit 61 of the fact that the music has been fully reproduced without being skipped. In this case, the manipulation unit 61 transmits a positive evaluation to the music distribution server 14 along with a music ID of fully reproduced music and a user ID. Furthermore, when an explicit positive manipulation (a specific manipulation indicating that the user likes the corresponding music) to the manipulation devices 36 is performed during music reproduction, a positive evaluation is transmitted to the music distribution server 14 along with a music ID of reproduced music and a user ID. The positive or negative evaluation generated for each piece of music delivered to the music distribution server 14 is used to generate a preference vector indicating a feature of music preferred by each user or generate rankings of pieces of music preferred by a plurality of users in the music distribution server 14.

Figure 7:
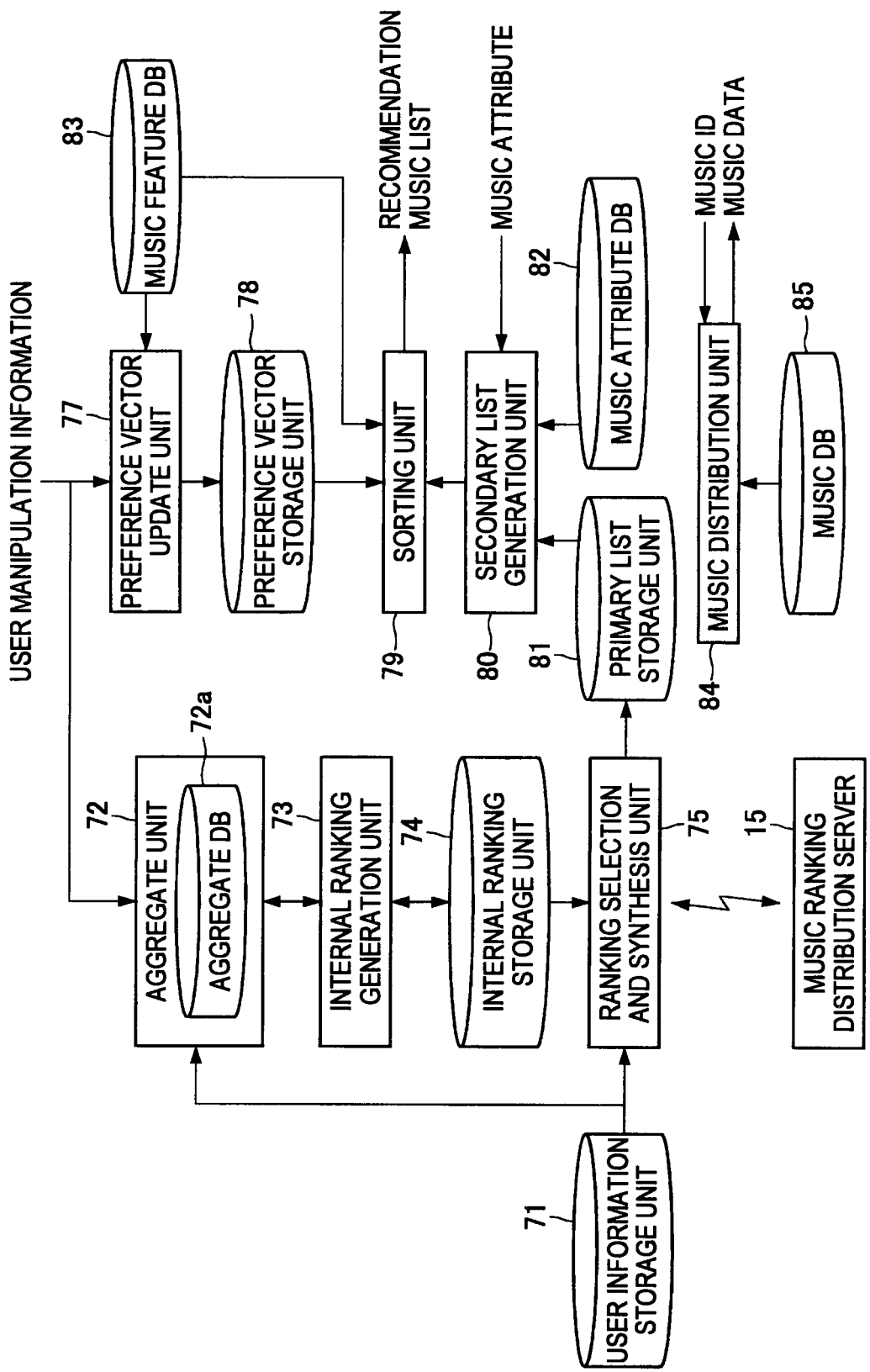
FIG. 7 is a functional block diagram of a music distribution server.

Next, a functional configuration of the music distribution server 14 will be described. FIG. 7 is a functional block diagram of the music distribution server 14. As shown in the same drawing, the music distribution server 14 is configured to functionally include a user information storage unit 71, an aggregate unit 72, an internal ranking generation unit 73, an internal ranking storage unit 74, a ranking selection and synthesis unit 75, a preference vector update unit 77, a preference vector storage unit 78, a sorting unit 79, a secondary list generation unit 80, a primary list storage unit 81, a music attribute DB 82, a music feature DB 83, a music distribution unit 84, and a music DB 85. These functional elements are implemented by a program executed in the music distribution server 14.

The user information storage unit 71 is configured using the HDD 23 or a separate DB (not shown), and stores attributes of users. FIG. 8 schematically shows storage content of the user information storage unit 71. User IDs, which are identification information of users, and attributes of the users such as age, a city of residence, and use language are associated and stored. The storage content of the user information storage unit 71 may be pre-registered from the user device 12.

The aggregate unit 72 aggregates information related to an evaluation transmitted from the user device 12 and information related to a music list transmitted to the user device 12. The aggregate unit 72 includes an aggregate DB 72a configured using the HDD 23 or a separate DB (not shown). An aggregate result is stored in the aggregate DB 72a. FIG. 9 schematically shows storage content of the aggregate DB 72a in which a music ID, which is music identification information, and an aggregate value x-y-z of a user attribute range (in which age is 13 years old or less, a city of residence is Tokyo, use language is Japanese, and the like) are associated and stored. Here, the aggregate value includes three numeric values: the number of times x included in a music list transmitted to the user device 12, the number of times y a positive evaluation for corresponding music is transmitted from the user device 12, and the number of times z a negative evaluation for corresponding music is transmitted from the user device 12. If a music ID, a user ID, and a positive or negative evaluation are received from the user device 12, the aggregate unit 72 reads attributes of a user associated with the user ID received from the user information storage unit 71, and updates the number of times y or the number of times z in an aggregate value of a user attribute range to which the attributes of the user belong. Specifically, the number of times y is incremented by 1 if the positive evaluation is received, and the number of times z is incremented by 1 if the negative evaluation is received. When the sorting unit 79 generates a music list and transmits the generated music list to the user device 12, a music ID and a user ID of a user of the user device 12 of a destination of the music list included in the music list are acquired, and attributes of the user associated with the user ID are read from the user information storage unit 71. In the aggregate value of the user attribute range to which the read attributes belong, the number of times x described above is incremented by 1.

Figures 10, 11:
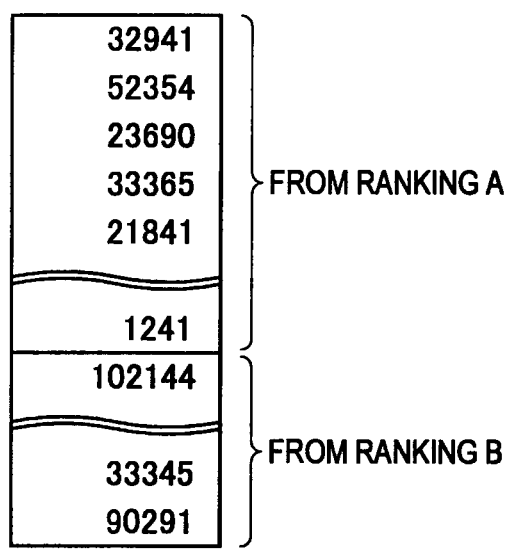
FIG. 10 is a diagram showing storage content of an internal ranking storage unit.
FIG. 11 is a diagram showing ranking synthesis.

The internal ranking generation unit 73 generates a ranking for a range of various user attributes periodically such as weekly or monthly on the basis of storage content of the aggregate DB 72a, and stores the ranking in the internal ranking storage unit 74. As shown in FIG. 10, the internal ranking storage unit 74 is configured using the HDD 23 or a separate DB (not shown), and various rankings generated by the internal ranking generation unit 73 are stored in association with generation times and user attribute ranges thereof. For example, rankings of pieces of music preferred by a user who is 15 years old or less, whose city of residence is Tokyo, and whose use language is Japanese are generated by listing IDs of a predetermined number of (for example, 100) pieces of music in descending order of total values of the number of times y recorded in columns of "13 years old or less/Tokyo/Japanese," "14 years old/Tokyo/Japanese," and "15 years old/Tokyo/Japanese" shown in FIG. 9. At this time, the rankings may be generated by listing a predetermined number of music IDs in descending order of a ratio of a total value of the number of times y to a total value of the number of times x described above, that is, a ratio of the number of positive evaluations to the number of recommendations.

The ranking selection and synthesis unit 75 reads the attributes of the user associated with the user ID included in the request of the music list transmitted from the user device 12 from the user information storage unit 71, and reads rankings associated with a range including the attributes of the user from the internal ranking storage unit 74. The rankings corresponding to the attributes of the user are received from the music ranking distribution server 15. For example, the latest rankings in the city of residence of the user may be received, and the rankings issued in the city of residence of the user when the user was 15 years old may be received on the basis of the age of the user. The ranking selection and synthesis unit 75 receives the rankings associated with the attributes of the user as described above and synthesizes the rankings as shown in FIG. 11. At this time, all music IDs included in rankings may not be included in a list after synthesis.

The ranking selection and synthesis unit 75 may read the rankings associated with the range including the attributes of the user and rankings associated with a range adjacent thereto from the internal ranking storage unit 74, and synthesize the rankings. In this case, the number of pieces of music included in the list after the synthesis from the rankings associated with the range including the attributes of the user may be less than the number of pieces of music included in the list after the synthesis from the rankings associated with the adjacent range. The rankings synthesized by the ranking selection and synthesis unit 75, that is, a list of music IDs, are stored in the primary list storage unit 81 configured using the HDD 23 or a separate DB (not shown).

Next, the music feature DB 83 is configured using the HDD 23 or a separate DB (not shown) in which music IDs and a plurality of feature quantities are associated and stored as shown in FIG. 12. The features are, for example, a music tempo, a degree of sound of a specific frequency included in music, a frequency of a specific keyword included in expository text of music, and the like. The feature quantities may be input as results of analysis processing by a computer. Hereinafter, a vector having each feature quantity as a component is referred to as a feature vector.

The preference vector storage unit 78 is configured using the HDD 23 or a separate DB (not shown), and stores a preference vector of each user. Like the feature vector of each piece of music, the preference vector is a vector having each feature quantity as a component shown in FIG. 12. The preference vector may be generated on the basis of a feature vector of music preferred by the user.

The preference vector update unit 77 updates a preference vector stored in the preference vector update unit 77 on the basis of information related to an evaluation for each piece of music transmitted from the user device 12. For example, if a music ID, a user ID, and a positive evaluation are received from the user device 12, a feature vector associated with the received music ID is read from the music feature DB 83, and a direction of the preference vector stored in the preference vector storage unit 78 associated with the received user ID is set to be close to a direction of the read feature vector. The preference vector update unit 77 is provided in the side of the user device 12, so that the preference vector update unit 77 within the user device 12 can update the preference vector stored in the user device 12 on the basis of information related to an evaluation for each piece of music obtained by the manipulation unit 61. At this time, the preference vector update unit 77 may download a feature vector of music from the music feature DB 83 within the music distribution server 14, or a DB equal to the music feature DB 83 is provided in the user device 12, so that the feature vector of music can be read from the DB. Thereby, a preference vector constantly managed within the user device 12 to be most recent may be included in a request of the music list as described above and transmitted to the music distribution server 14. The music distribution server 14 receiving the preference vector stores the preference vector in the preference vector storage unit 78 of the music distribution server 14.

The music attribute DB 82 is configured using the HDD 23 or a separate DB (not shown) in which a music ID and flags indicating whether music corresponds to a plurality of respective music attributes are stored to be associated with each other, as shown in FIG. 13. The music attribute may be, for example, a mood such as relaxed, ballad, happy, active, and the like, and may be input as a result of analysis processing by a computer.

The secondary list generation unit 80 reads flags associated with each music ID included in a list stored in the primary list generation unit 81 from the music attribute DB 82, and determines whether or not there is music suitable for attributes included in a request transmitted from the user device 12. Only music IDs of pieces of music suitable for the attributes included in the request transmitted from the user device 12 are extracted from music IDs included in the list stored in the primary list storage unit 81, and a list of the extracted music IDs is supplied to the sorting unit 79 as a secondary list. The sorting unit 79 reads feature vectors associated with the music IDs included in the secondary list from the music feature DB 83, and reads a preference vector stored in the preference vector storage unit 78 in association with the user ID included in the request received from the user device 12. Similarity between two vectors is calculated and music IDs are sorted in descending order of similarity. The similarity between vectors may be an angle between two vectors. In this case, the smaller the angle, the higher the similarity. The sorting unit 79 includes a predetermined number of (for example, 10) music IDs in a recommendation music list in descending order of similarity between two vectors, and returns the same list to the user device 12.

The music DB 85 is configured using the HDD 23 or a separate DB (not shown), and stores data of music associated with a music ID. The music distribution unit 84 receives a music ID from the user device 12, reads music data stored in association with the music ID from the music DB 85, and returns the music data to the user device 12.

Figure 14:
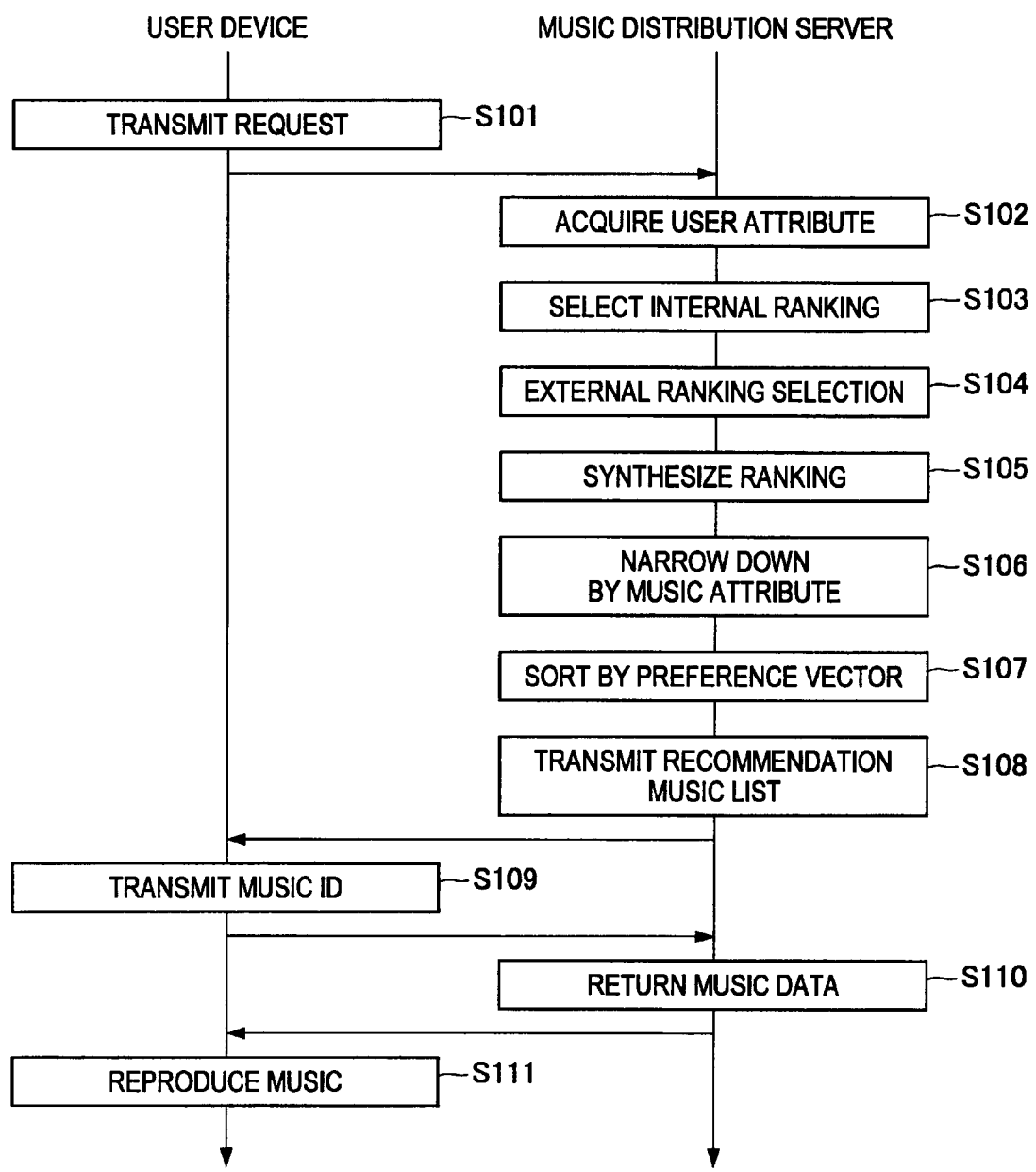
FIG. 14 is an operation sequence diagram of the content recommendation system according to an embodiment of the present invention.

Here, an operation of the content recommendation system 10 according to this embodiment will be described. FIG. 14 is an operation sequence diagram of the content recommendation system 10. As shown in the same drawing, the user device 12 transmits a music list request including a user ID and a music attribute to the music distribution server 14 (S101). In the music distribution server 14, the ranking selection and synthesis unit 75 reads user attributes associated with the received user ID from the user information storage unit 71 (S102), and acquires rankings corresponding to the read user attributes from the internal ranking storage unit 74 and the music ranking distribution server 15 (S103 and S104). The acquired rankings are synthesized and stored in the primary list storage unit 81 (S105). Next, in the music distribution server 14, the secondary list generation unit 80 generates a secondary list by narrowing down music IDs stored in the primary list storage unit 81 on the basis of music attributes (S106). Furthermore, the sorting unit 79 sorts music IDs included in the secondary list according to similarities between feature vectors associated with the music IDs and a preference vector of a user (S107), and generates a recommendation music list from a predetermined number of music IDs in descending order of similarity to return the recommendation music list to the user device 12 (S108). In the user device 12, the music reproduction unit 62 receives the recommendation music list and transmits the music IDs included in the recommendation music list to the music distribution server 14 (S109). The music distribution server 14 returns music data associated with the music IDs received by the music distribution unit 84 to the user device 12 (S110). The music reproduction unit 62 of the user device 12 reproduces the received music data. Likewise, if music reproduction for all the music IDs included in the recommendation music list is performed, the user device 12 re-executes the process of S101.

Because a recommendation music list is generated using various rankings, which are a list of content sequentially generated over time, the above-described content recommendation system 10 can prevent a problem of the same music being continuously recommended to the user, and recommend various music to the user.

The present invention is not limited to the above-described embodiments, and various modifications are possible. Although an example in which the music distribution server 14 generates a recommendation music list has been described above, the functions shown in FIG. 7, particularly, the ranking selection and synthesis unit 75, the primary list storage unit 81, the secondary list generation unit 80, the sorting unit 79, the preference vector storage unit 78, and the preference vector update unit 77, are provided in the user device 12, so that the user device 12 can generate a recommendation music list.

The invention claimed is:

1. A content recommendation apparatus comprising:
a hardware processor;
a storage device configured to store content attribute information and content feature information of content;
a list generation unit configured to
calculate, by the processor, a ratio of a number of times each piece of the content having been manipulated by a first user to a number of times each piece of the content having been presented to the first user,
generate, by the processor, a first content list having a first number of content entries for the first user, based on the ratio and user ratings of a plurality of second users having attribute information similar to attribute information of the first user, a portion of the user ratings being generated when a reproduction of a first piece of the content is stopped before being completely reproduced and replaced with a second piece of the content,
convert, by the processor, the first content list to a second content list having a second number of content entries less than the first number, based on content attribute information transmitted from a user device associated with the first user,
calculate, by the processor, a similarity between feature vectors associated with the content entries on the second list and preference vectors associate with the first user, and
re-organize, by the processor, the content entries of the second list based on the calculated similarity to generate a third content list; and
a content extraction unit configured to extract, by the processor, some content based on a selection of the first user from content entries of the third content list.

2. The content recommendation apparatus according to claim 1, wherein the user ratings include positive ratings and negative ratings.

3. The content recommendation apparatus according to claim 2, wherein the positive ratings are obtained through no user inputs.

4. The content recommendation apparatus according to claim 2, wherein the negative ratings are obtained through user manipulations on content during reproduction of the content.

5. The content recommendation apparatus according to claim 1, wherein the user ratings are further generated when a reproduction of a first piece of the content is completed without being skipped.

6. The content recommendation apparatus according to claim 1, wherein the list generation unit is configured to generate, by the processor, the third content list by changing a sequence of the content entries of the second list based on the calculated similarity.

7. The content recommendation apparatus according to claim 6, wherein the sequence of the content entries of the second list is changed in a descending order of the calculated similarity.

8. A computer-implemented content recommendation method executed by a computer, comprising:
storing, by the computer, content attribute information and content feature information of content;
calculating, by the computer, a ratio of a number of times each piece of the content having been manipulated by a first user to a number of times each piece of the content having been presented to the first user;
generating, by the computer, a first content list having a first number of content entries for the first user, based on the ratio and user ratings of a plurality of second users having attribute information similar to attribute information of the first user, a portion of the user ratings being generated when a reproduction of a first piece of the content is stopped before being completely reproduced and replaced with a second piece of the content;
reducing, by the computer, the first content list to a second content list having a second number of content entries less than the first number, based on content attribute information transmitted from a user device associated with the first user;
calculating a similarity between feature vectors associated with the content entries on the second list and preference vectors associate with the first user;
re-organizing the content entries of the second list based on the calculated similarity to generate a third content list;
extracting some content based on a selection of the first user from content entries of the third content list;
presenting the extracted content to the first user.

9. The method according to claim 8, wherein the user ratings are further generated when a reproduction of a first piece of the content is completed without being skipped.

10. The method according to claim 8, further comprising:
generating, by the computer, the third content list by changing a sequence of the content entries of the second list based on the calculated similarity.

11. The method according to claim 10, wherein the sequence of the content entries of the second list is changed in a descending order of the calculated similarity.

12. A content recommendation device comprising:
a hardware processor;
a storage device configured to store content attribute information and content feature information of content;
a list generation unit configured to
calculate, by the processor, a ratio of a number of times each piece of the content having been manipulated by a first user to a number of times each piece of the content having been presented to the first user;
generate, by the processor, a first content list having a first number of content entries for the first user, based on the ratio and user ratings of a plurality of second users having attribute information similar to attribute information of the first user, a portion of the user ratings being generated when a reproduction of a first piece of the content is stopped before being completely reproduced and replaced with a second piece of the content;

convert, by the processor, the first content list to a second content list having a second number of content entries less than the first number, based on content attribute information transmitted from a user device associated with the first user;

calculate, by the processor, a similarity between feature vectors associated with the content entries on the second list and preference vectors associate with the first user, and re-organize, by the processor, the content entries of the second list based on the calculated similarity to generate a third content list;

a content extraction unit configured to extract, by the processor, some content based on a selection of the first user from content entries of the third content list; and a content presentation unit configured to present, by the processor, the content extracted by the content extraction unit to the first user.

13. The device according to claim 12, wherein the user ratings are further generated when a reproduction of a first piece of the content is completed without being skipped.

14. The device according to claim 12, wherein the list generation unit is configured to generate, by the processor, the third content list by changing a sequence of the content entries of the second list based on the calculated similarity.

15. The device according to claim 14, wherein the sequence of the content entries of the second list is changed in a descending order of the calculated similarity.

16. A non-transitory computer-readable storage medium storing a program which, when executed by a computer, causes the computer to perform:

storing, by the computer, content attribute information and content feature information of content;

calculating, by the computer, a ratio of a number of times each piece of the content having been manipulated by a first user to a number of times each piece of the content having been presented to the first user;

generating, by the computer, a first content list having a first number of content entries for the first user, based on the ratio and user ratings of a plurality of second users having attribute information similar to attribute information of the first user, a portion of the user ratings being generated when a reproduction of a first piece of the content is stopped before being completely reproduced and replaced with a second piece of the content;

reducing, by the computer, the first content list to a second content list having a second number of content entries less than the first number, based on content attribute information transmitted from a user device associated with the first user;

calculating a similarity between feature vectors associated with the content entries on the second list and preference vectors associate with the first user;

re-organizing the content entries on the second list based on the calculated similarity to generate a third content list;

extracting some content based on a selection of the first user from content entries of the third content list;

presenting the extracted content to the first user.

* * * * *